US012803352B2

(12) United States Patent
Yamanaka et al.

(10) Patent No.: US 12,803,352 B2
(45) Date of Patent: Nov. 17, 2026

(54) ROTATING ELECTRIC MACHINE THAT SUPPRESSES LEAKAGE OF MAGNETIC FLUX

(71) Applicant: HONDA MOTOR CO., LTD., Tokyo (JP)

(72) Inventors: Shoi Yamanaka, Tokyo (JP); Tatsuya Ohzu, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 191 days.

(21) Appl. No.: 18/782,063

(22) Filed: Jul. 24, 2024

(65) Prior Publication Data

US 2025/0088050 A1 Mar. 13, 2025

(30) Foreign Application Priority Data

Sep. 12, 2023 (JP) ................................ 2023-147618

(51) Int. Cl.
*H02K 1/276* (2022.01)

(52) U.S. Cl.
CPC ......... *H02K 1/276* (2013.01); *H02K 2213/03* (2013.01)

(58) Field of Classification Search
CPC ........ H02K 1/27; H02K 1/276; H02K 1/2766; H02K 2213/03
See application file for complete search history.

(56) References Cited

U.S. PATENT DOCUMENTS

| | | | | |
|---|---|---|---|---|
| 2019/0173336 A1* | 6/2019 | Takeuchi | ............... | H02K 1/246 |
| 2020/0212736 A1* | 7/2020 | Ohzu | ..................... | H02K 1/276 |
| 2023/0023710 A1* | 1/2023 | Abdelli | ................ | H02K 21/025 |

FOREIGN PATENT DOCUMENTS

| | | | |
|---|---|---|---|
| JP | 2020-108275 | 7/2020 | |
| JP | 2020-114077 | 7/2020 | |
| JP | 2020-137139 | 8/2020 | |
| WO | 2018/043081 | 3/2018 | |
| WO | WO-2018099811 A1 * | 6/2018 | ........... H02K 1/2766 |
| WO | WO-2022084080 A1 * | 4/2022 | ........... H02K 1/2766 |

OTHER PUBLICATIONS

Text Version of WO 2022084080 A1 (Year: 2022).*
Text Version of WO 2018099811 A1 (Year: 2018).*
Japanese Office Action for Japanese Patent Application No. 2023-147618 mailed Mar. 5, 2025.

* cited by examiner

*Primary Examiner* — Alexander A Singh
*Assistant Examiner* — Charlie Frank Mann, Jr.
(74) *Attorney, Agent, or Firm* — Amin, Turocy & Watson, LLP

(57) ABSTRACT

A rotating electric machine includes a stator and a rotor. A magnetic pole of the rotor includes a magnet hole, a permanent magnet, a first void portion, a second void portion, and a rib. The magnet hole extends so as to cross a magnetic pole centerline in a circumferential direction and is formed in substantially an arc shape when seen in an axial direction such that both end portions approach an outer circumferential edge portion of the rotor. The first void portion is formed between both end portions of the magnet hole in an extension direction and the permanent magnet. The second void portion extends separately from the magnet hole on extension of both end portions of the magnet hole in the extension direction. The rib connects an outer region and an inner region of the first void portion and the second void portion in a radial direction.

6 Claims, 12 Drawing Sheets

ROTATING ELECTRIC MACHINE THAT SUPPRESSES LEAKAGE OF MAGNETIC FLUX

CROSS-REFERENCE TO RELATED APPLICATION

Priority is claimed on Japanese Patent Application No. 2023-147618, filed Sep. 12, 2023, the content of which is incorporated herein by reference.

BACKGROUND OF THE INVENTION

Field of the Invention

The present invention relates to a rotating electric machine in which a rotor is rotatably disposed inside an annular stator in a radial direction.

Description of Related Art

As a rotating electric machine, a configuration in which a rotor is rotatably disposed inside an annular stator in a radial direction and a plurality of permanent magnets are provided inside the rotor is known (for example, see Japanese Unexamined Patent Application, First Publication No. 2020-137139).

In the rotating electric machine disclosed in Japanese Unexamined Patent Application, First Publication No. 2020-137139, a plurality of magnetic poles are separately provided inside the rotor in a circumferential direction. Each of the magnetic poles is provided laterally symmetrically with the magnetic pole centerline (d axis) sandwiched between substantially arc-shaped (dogleg shape, <shape) magnet holes in a radial direction, and a permanent magnet is inserted into each of the magnet holes. Left and right magnet holes are formed such that all magnetic holes form substantially a U shape that opens outward in the radial direction.

The permanent magnet accommodated in each magnet hole generates a magnet torque (attractive/repulsive force) between the permanent magnet and the magnetic pole due to winding current on the side of the stator. In addition, a region in which the permanent magnet in each magnet hole is not present functions as a flux barrier configured to restrict a flow of a magnetic flux. A vicinity portion of an outer circumferential edge of the rotor adjacent to outer ends of the pair of magnet holes that form substantially a U shape functions as a salient pole on the side of the rotor, and becomes a passage through which a rotating magnetic flux of the stator flows. The rotor is rotated by receiving a magnet torque and a reluctance torque of the permanent magnets.

In addition, a center rib is disposed along a magnetic pole centerline between end portions of the pair of magnet holes on the side of the magnetic pole centerline. The center rib connects an outer region and an inner region of the magnet hole in the radial direction divided by the magnet hole, and maintains mechanical strength of an outer circumferential edge portion of the rotor. Since a large centrifugal force is applied to the outer circumferential edge portion of the rotor upon rotation of the rotor, the center rib prevents the outer circumferential edge portion of the rotor from deforming in response to the centrifugal force.

SUMMARY OF THE INVENTION

In the rotating electric machine disclosed in Japanese Unexamined Patent Application, First Publication No. 2020-137139, since the center rib is disposed between the left and right magnet holes, high mechanical strength of the rotor can be maintained. However, since the center rib is disposed on the vicinity portion of the magnetic pole centerline (d axis) on which a flow of the magnet magnetic flux or the rotating magnetic flux of the stator is concentrated, the center rib becomes a short circuit path for the magnet magnetic flux and the rotating magnetic flux, and the leaked magnetic flux increases. For this reason, in the above-mentioned rotating electric machine, the magnetic force of the magnet cannot be used efficiently, which causes an increase in size of the permanent magnet to be mounted.

An aspect of the present invention is directed to providing a rotating electric machine capable of increasing mechanical strength of a rotor while suppressing leakage of a magnetic flux. An aspect of the present invention is directed to achieving reduction in size and weight of permanents magnet to be mounted and contributing to energy efficiency.

A rotating electric machine according to an aspect of the present invention includes an annular stator (for example, a stator (10) of an embodiment), and a rotor (for example, a rotor (11) of the embodiment) rotatably disposed inside the stator in a radial direction and on which a plurality of magnetic poles (for example, magnetic poles (18) of the embodiment) are spaced apart from each other in a circumferential direction, the magnetic poles of the rotor each including a magnet hole (for example, a magnet hole (19) of the embodiment) extending so as to cross a magnetic pole centerline (for example, a magnetic pole centerline (op) of the embodiment), which extends in the radial direction of the rotor, in the circumferential direction and formed in substantially an arc shape when seen in the axial direction such that both end portions in an extension direction approach an outer circumferential edge portion of the rotor, a permanent magnet (for example, a permanent magnet (13A) of the embodiment) inserted into the magnet hole, a first void portion (for example, a first void portion (21) of the embodiment) formed between both end portions of the magnet hole in the extension direction and the permanent magnet, a second void portion (for example, a second void portion (22) of the embodiment) extending on an extension line of both end portions of the magnet hole in the extension direction and separated from the magnet hole, and a rib (for example, a rib (23) of the embodiment) disposed between the first void portion and the second void portion and connecting an outer region and an inner region of the first void portion and the second void portion in the radial direction, and provided that an opening angle between the magnetic pole centerline and a normal line (for example, a normal line (nm) of the embodiment) passing through an outer end portion of the permanent magnet on a side separated from the magnetic pole centerline is $\theta$Mag, provided that an opening angle between the magnetic pole centerline and a normal line (for example, a normal line (nr) of the embodiment) passing through an outer end portion of the first void portion on a side separated from the magnetic pole centerline is $\theta$Rib, provided that an opening angle between the magnetic pole centerline and a normal line (for example, a normal line (ns) of the embodiment) passing through an outer end portion of the second void portion on a side separated from the magnetic pole centerline is $\theta 1$, and provided that an opening angle between the magnetic pole centerline and a normal line (for example, a normal line (ni) of the embodiment) passing through an intermediate position between the outer end portion of the permanent magnet on the side separated from the magnetic pole centerline and the outer end portion of the second void portion on the side separated from the magnetic pole centerline is θ2, wherein the opening angle θRib is set to satisfy the following Equation (1) and Equation (2), $$\theta 2=(\theta 1+\theta Mag)/2 \quad (1)$$

$$\theta Rib<\theta 2. \quad (2)$$

In the above-mentioned configuration, the magnet is disposed so as to cross the magnetic pole centerline, and the ribs that connect the outer region and the inner region of the void portions (the first void portion and the second void portion) in the radial direction are disposed on one end side and the other end side of the magnet hole in the extension direction. For this reason, in a vicinity portion of the magnetic pole centerline on which the magnet magnetic flux and the rotating magnetic flux of the stator are likely to be concentrated, magnetic flux leakage due to wraparound of the magnet magnetic flux or the rotating magnetic flux is less likely to occur. In addition, when a tensile load is input in a direction substantially along the magnetic pole centerline, tension is applied to the ribs on both sides of the magnet hole in the extension direction, and deformation of the outer circumferential edge portion of the rotor is suppressed. In particular, since the rib is formed such that the opening angle θRib satisfies the above-mentioned Equation (1) and Equation (2), bending stress is less likely to occur on the rib when a tensile load is applied in a direction substantially along the magnetic pole centerline. For this reason, high mechanical strength of the rotor can be maintained.

The first void portion may include a first flange portion (for example, a first flange portion (24) of the embodiment) which is provided on an end portion facing the rib and which is thicker than the permanent magnet, and the second void portion may include a second flange portion (for example, a second flange portion (25) of the embodiment) which is provided on an end portion on a side facing the rib and which is thicker than the permanent magnet.

In this case, a length of the rib can be increased by the first flange portion and the second flange portion thicker than the permanent magnet. Accordingly, a magnetic path resistance of the magnetic flux that attempts to flow through the rib increases, and it is possible to further suppress wraparound of the magnet magnetic flux and the rotating magnetic flux via the rib. Accordingly, in the case in which this configuration is employed, the magnetic force of the permanent magnet can be more effectively used, and further reduction in size and weight of the permanent magnet can be achieved.

The first flange portion and the second flange portion may have substantially the same extension length inward in the radial direction of the rotor.

When one of the first flange portion and the second flange portion has a larger extension length on an inner side in the radial direction than that of the other, the one having the larger extension length is likely to impede the flow of the rotating magnetic flux. However, in the case of this configuration, since the extension lengths inward in the radial direction of the first flange portion and the second flange portion are substantially the same, these flange portions become less likely to obstruct the flow of the rotating magnetic flux. Accordingly, when this configuration is employed, the magnetic force of the permanent magnet can be more effectively used.

The first flange portion and the second flange portion may extend inward in the radial direction and outward in the radial direction of the rotor, respectively.

In this case, the length of the rib between the first flange portion and the second flange portion is made sufficient while the extension length (protrusion length) per side of the inner and outer sides in the radial direction of the first flange portion and the second flange portion is suppressed, and thus the magnetic flux resistance of the magnetic flux that tries to flow through the rib can be set sufficiently large.

The second void portion may include a third flange portion which is provided on an outer end portion separated from the magnetic pole centerline and which is thicker than the permanent magnet.

In this case, a length of the magnetic flux passage between the outer end portion of the second void portion and the outer circumferential surface of the rotor is increased, and as a result, the magnetic path resistance of the magnetic flux flowing through the magnetic flux passage is increased. Accordingly, wraparound of the magnetic flux near the outer end portion of the second void portion is suppressed. Accordingly, when this configuration is employed, the magnetic force of the permanent magnet can be more effectively used, and further reduction in size and weight of the permanent magnet can be achieved.

Configuration parts of the magnetic pole including the magnet hole, the permanent magnet, the first void portion, the second void portion, and the rib may be arranged in a plurality of layers in the radial direction.

In this case, the same function as above can be obtained by the configuration part of the magnetic pole in each layer, and even larger rotating torque can be obtained by the configuration part of the magnetic pole in multiple layers.

In the rotating electric machine according to the present invention, the magnet hole is disposed to cross the magnetic pole centerline, and the ribs that connect the outer region and the inner region of the first void portion and the second void portion in the radial direction are disposed on one end side and the other end side of the magnet hole in the extension direction. For this reason, wraparound of the magnet magnetic flux or the rotating magnetic flux in the vicinity portion of the magnetic pole centerline can be suppressed, and mechanical strength of the rotor can be increased by the left and right ribs. Accordingly, when the rotating electric machine according to the present invention is employed, reduction in size and weight of the mounted permanent magnet can be achieved.

DETAILED DESCRIPTION OF THE INVENTION

Hereinafter, embodiments of the present invention will be described with reference to the accompanying drawings. In each of the embodiments described below, the same portions are designated by the same reference signs and overlapping description will be partially omitted.

First Embodiment

Figure 1:
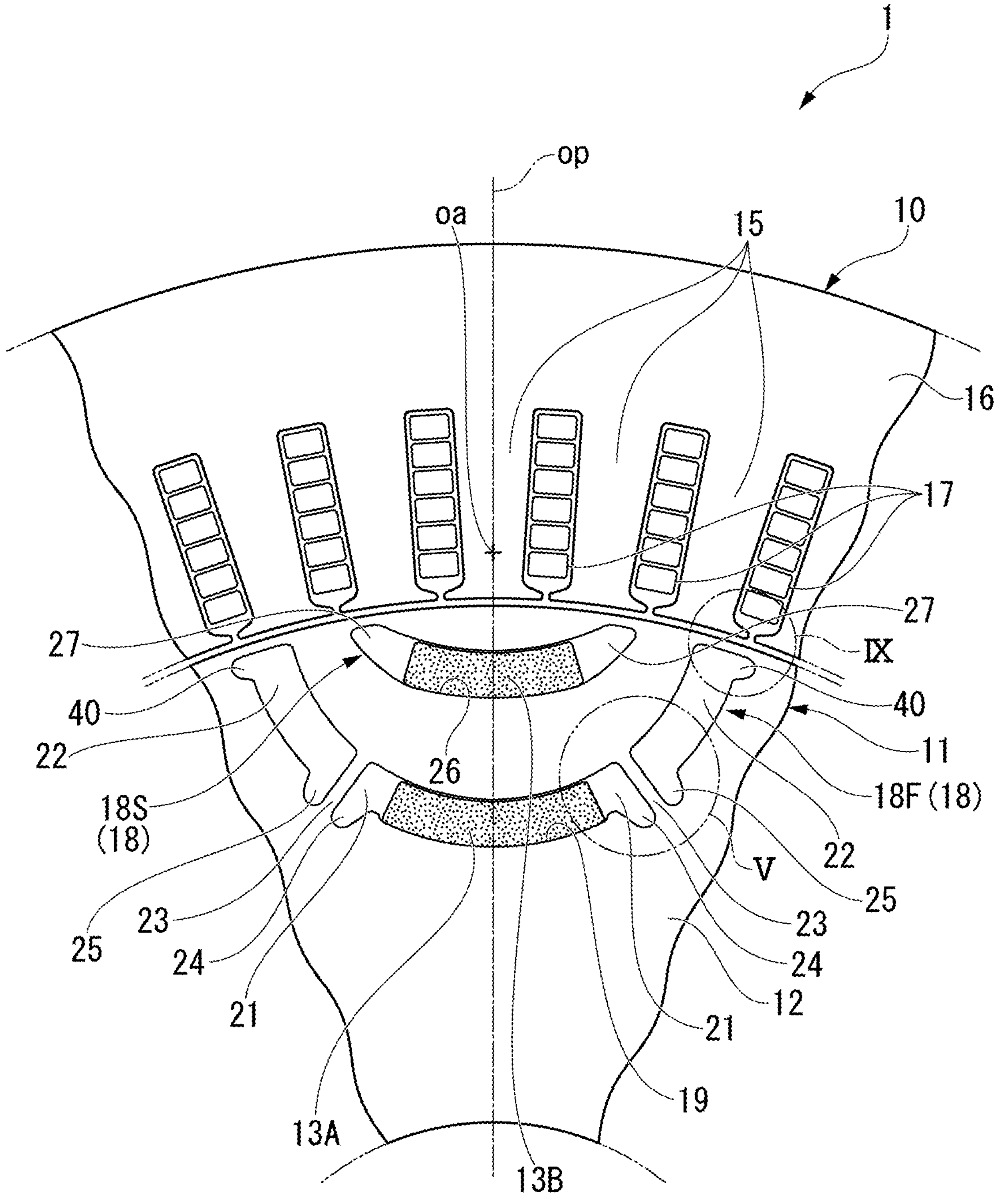
FIG. 1 is a cross-sectional view of a rotating electric machine of a first embodiment perpendicular to an axial direction.

FIG. 1 is a view showing a cross section of a rotating electric machine 1 of an embodiment perpendicular to an axial direction.

The rotating electric machine 1 of the embodiment can be used as, for example, a driving source or the like of a vehicle. The rotating electric machine 1 includes an annular stator 10, and a rotor 11 rotatably disposed inside the stator 10 in a radial direction. The rotating electric machine 1 of the embodiment is a magnet synchronous rotating electric machine in which a plurality of permanent magnets 13A and 13B are buried in a rotor core 12 of the rotor 11.

The stator 10 includes an annular stator core 16 having a plurality of teeth 15 formed on an inner circumferential edge portion thereof, and a coil 17 wound on each of the teeth 15 of the stator core 16. The coil 17 is a coil having a U phase, a V phase and a W phase, which is connected to a driving circuit (not shown). The coil 17 wound around each of the teeth 15 generates a rotating magnetic field on an inner circumferential side of the stator 10 when three-phase alternating current is applied from the driving circuit.

Figure 2:
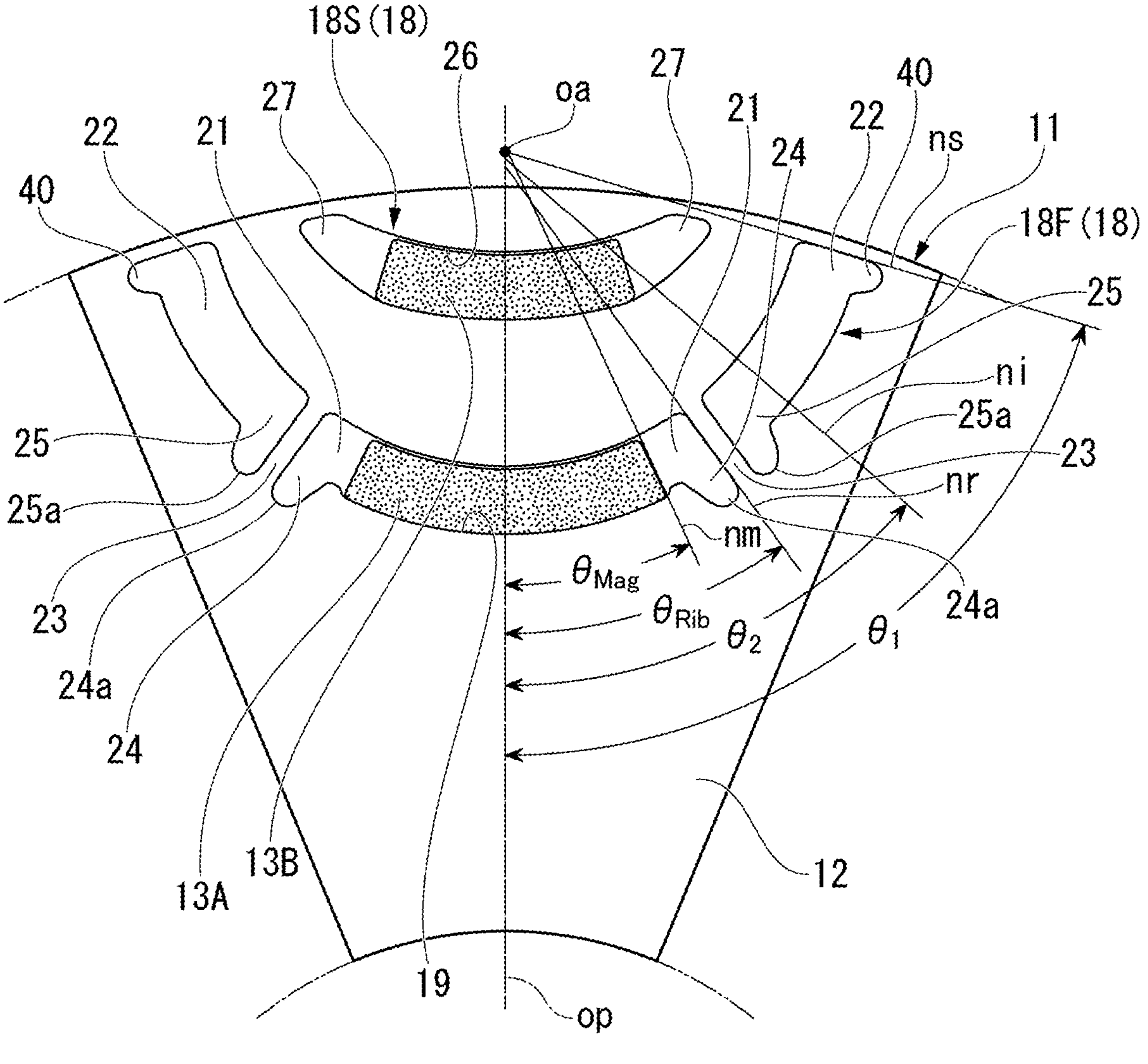
FIG. 2 is a cross-sectional view of a rotor of the first embodiment perpendicular to the axial direction.

FIG. 2 is a view showing a cross section of the rotor 11 perpendicular to the axial direction.

As shown in FIG. 1 and FIG. 2, the rotor 11 is entirely formed into a thick cylindrical shape, and a rotary shaft (not shown) is fixed to an axial center portion. The rotor 11 and the rotary shaft are disposed inside the stator 10 in the radial direction (inner circumferential side) coaxially with an inner circumferential surface of the stator 10. A micro gap is secured between an inner circumferential surface of the stator 10 and an outer circumferential surface of the rotor 11.

Further, in the description of the embodiment, a direction in which the rotor 11 and an axial center of the rotary shaft are directed is referred to as "an axial direction," and a radiation direction perpendicular to the axial direction and centered on the axial center is referred to as "a radial direction." In addition, a circumferential direction about the axial center is referred to as "a circumferential direction."

The rotor 11 includes the rotor core 12 formed of a magnetic body such as a laminated steel plate or the like, and multiple pairs of permanent magnets 13A and 13B buried in the rotor core 12. Two of the permanent magnets 13A and 13B disposed separately on an inner side and an outer side in the radial direction form a pair, and a plurality sets of the permanent magnets 13A and 13B forming the pairs are disposed separately in a circumferential region of the rotor core 12. The permanent magnets 13A and 13B that form the pairs are buried in the rotor core 12 such that a direction of the magnetic pole directs the same side in the radial direction. In addition, in the pairs of permanent magnets 13A and 13B adjacent to each other in the circumferential direction, the poles facing outward in the radial direction are opposite poles. A plurality of magnetic poles 18 having the permanent magnets 13A and 13B that form the pairs are disposed in the circumferential region of the rotor 11 at equal intervals.

Each of the magnetic poles 18 of the rotor 11 includes a first magnetic pole configuration part 18F disposed on an inner side in the radial direction, and a second magnetic pole configuration part 18S disposed on an outer side in the radial direction. That is, each of the magnetic poles 18 is constituted by the configuration parts (the first magnetic pole configuration part 18F and the second magnetic pole configuration part 18S) of the magnetic poles of the inner and outer two layers.

The first magnetic pole configuration part 18F includes a magnet hole 19, the permanent magnet 13A, a first void portion 21, a second void portion 22, and a rib 23.

The magnet hole 19 extends to straddle a magnetic pole centerline op (d axis) in the radial direction of the rotor 11 in the circumferential direction. The magnet hole 19 is a hole through which the rotor core 12 passes in the axial direction. A shape of the magnet hole 19 when seen in the axial direction is an arc shape in which an arbitrary point radially outward from the outer circumferential surface of the rotor 11 on the magnetic pole centerline op is set as an arc center oa. Both end portions of the magnet hole 19 in the extension direction are curved outward in the radial direction.

The permanent magnet 13A is formed in an arc shape when seen in the axial direction and inserted into the magnet hole 19 to cross the magnetic pole centerline op. The permanent magnet 13A is disposed in a center region of the magnet hole 19 in the extension direction. The arc shape of the permanent magnet 13A is an arc shape having the same radius as the magnet hole 19 about the arc center oa like the magnet hole 19. The permanent magnet 13A is fixed to the inner circumferential surface of the magnet hole 19 by press-fitting or adhesion. A length of the permanent magnet 13A in the extension direction is set sufficiently short compared to the length of the magnet hole 19 in the extension direction.

The first void portion 21 is a void portion formed between both end portions of the magnet hole 19 in the extension direction and each end surface of the permanent magnet 13A, which is provided to face both end surfaces of the permanent magnet 13A in the extension direction. The second void portion 22 is a void portion extending separately from the magnet hole 19 on extensions of both end portions of the magnet hole 19 in the extension direction, and has an arc shape having the same radius about the arc center oa like the first void portion 21. The second void portion 22 is constituted by a circular arc-shaped hole passing through the rotor core 12 in the axial direction. The first void portion 21 and the second void portion 22 function as a flux barrier configured to restrict a flow of a magnetic flux outside the permanent magnet 13A in the extension direction.

Figure 3:
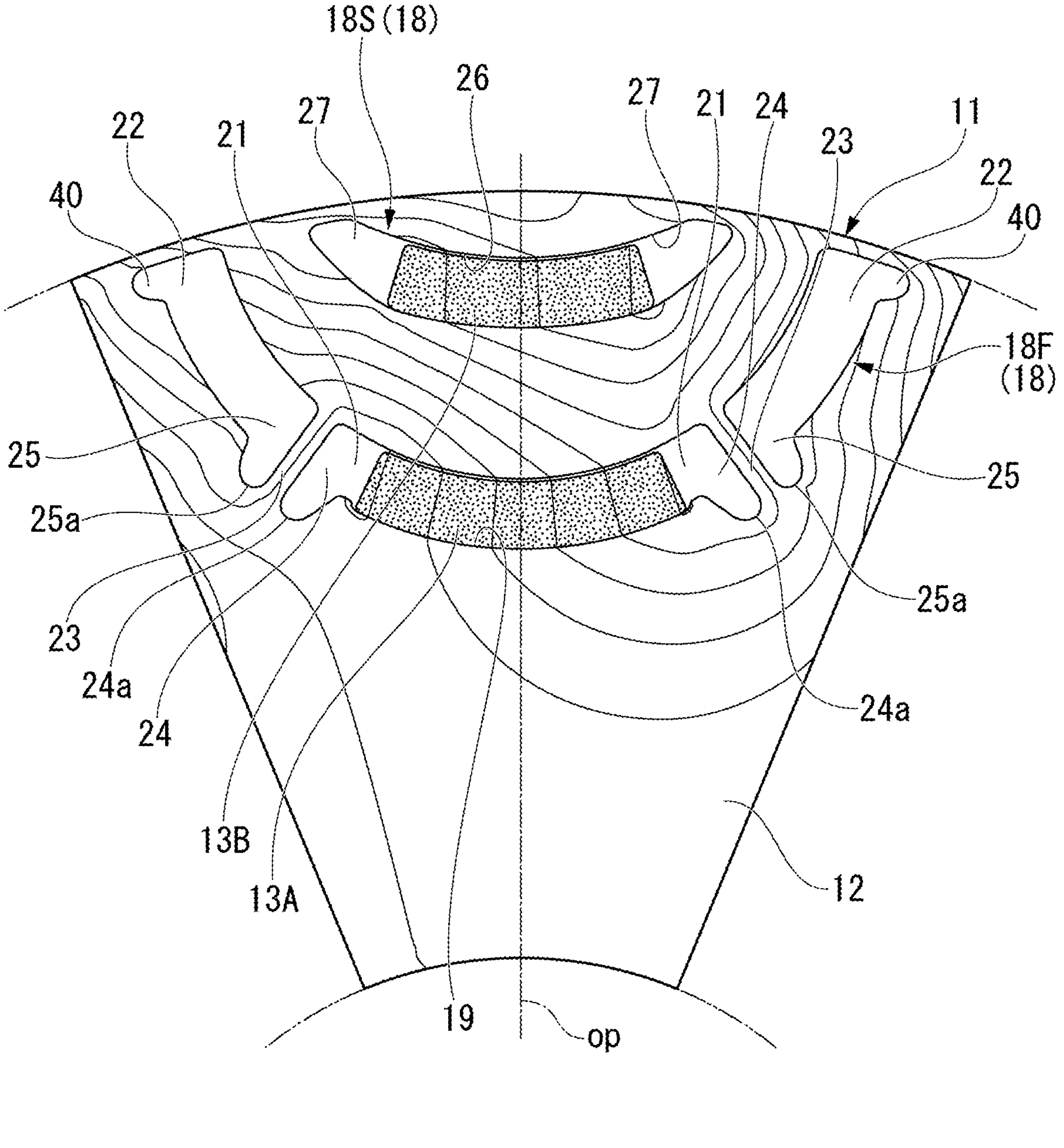
FIG. 3 is a cross-sectional view of the rotor of the first embodiment, also showing a flow of a magnetic flux in the rotor.

FIG. 3 is a cross-sectional view of the rotor 11 like FIG. 2, also showing a flow of a magnetic flux in the rotor 11. The flow of the magnetic flux in the rotor 11 is restricted by the first void portion 21 and the second void portion 22 as shown in the same drawing.

The rib 23 is disposed between the first void portion 21 and the second void portion 22 on left and right sides of the permanent magnet 13A. Each of the left and right ribs 23 extends substantially along a normal line about the arc center oa. Each of the ribs 23 connects an outer region and an inner region of the first void portion 21 and the second void portion 22 in the radial direction, and thus a decrease in mechanical strength of the rotor core 12 due to the void portions 21 and 22 is suppressed.

In the left and right ribs 23, an opening angle θRib for the magnetic pole centerline op is set to satisfy the following Equation (1) and Equation (2).

$$\theta 2=(\theta 1+\theta Mag)/2 \tag{1}$$

$$\theta Rib<\theta 2 \tag{2}$$

The opening angles θMag, θRib, θ1 and θ2 (see FIG. 2) in Equation (1) and Equation (2) are defined as follows.

[Opening Angle θMag]

An opening angle between a normal line nm (for example, a normal line about an arbitrary point near the arc center oa) passing through an outer end portion on a side of the permanent magnet 13A separated from the magnetic pole centerline op and the magnetic pole centerline op. Hereinafter, the opening angle θMag is referred to as "the opening angle θMag of the permanent magnet."

[Opening Angle θRib]

An opening angle between a normal line nr (for example, a normal line about an arbitrary point near the arc center oa) passing through an outer end portion on a side of the first void portion 21 separated from the magnetic pole centerline op and the magnetic pole centerline op. Hereinafter, the opening angle θRib is referred to as "the opening angle θRib of the rib 23."

[Opening Angle θ1]

An opening angle between a normal line ns (for example, a normal line about an arbitrary point near the arc center oa) passing through an outer end portion on a side of the second void portion 22 separated from the magnetic pole centerline op and the magnetic pole centerline op. Hereinafter, the opening angle θ1 is referred to as "the opening angle θ1 of the second void portion 22."

[Opening Angle θ2]

An opening angle between the magnetic pole centerline op and a normal line ni (for example, a normal line about an arbitrary point near the arc center oa) passing through an intermediate position between an outer end portion of the permanent magnet 13A on a side separated from the magnetic pole centerline op and an outer end portion of the second void portion 22 on a side separated from the magnetic pole centerline op.

Hereinafter, the opening angle θ2 is referred to as "the opening angle θ2 of the intermediate position of the void region."

Figure 4C:
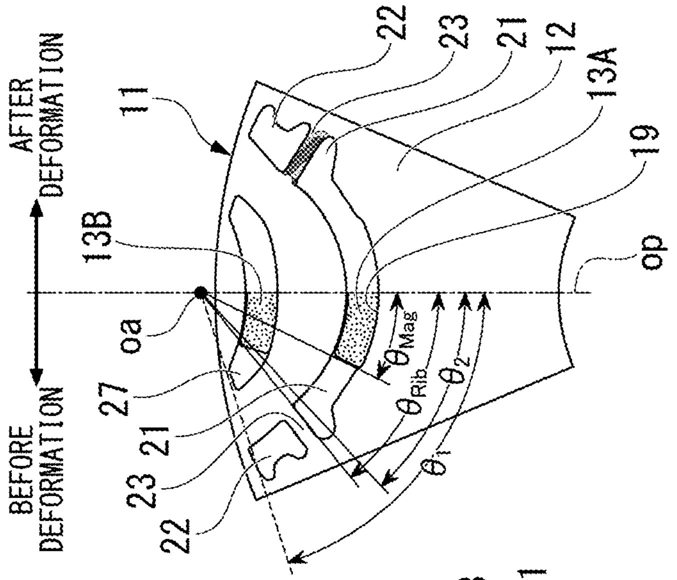
FIG. 4C is a schematic cross-sectional view of the rotor showing a deformation behavior of the rotor when a position of the rib is changed.
Figure 4B:
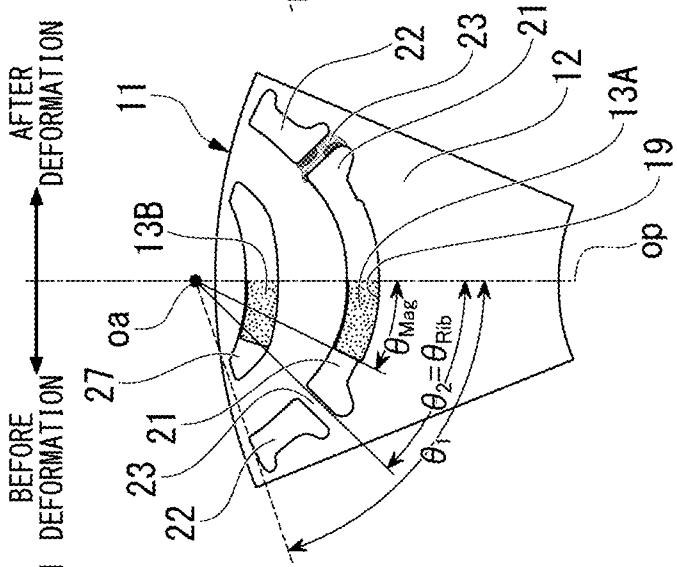
FIG. 4B is a schematic cross-sectional view of the rotor showing a deformation behavior of the rotor when a position of the rib is changed.
Figure 4A:
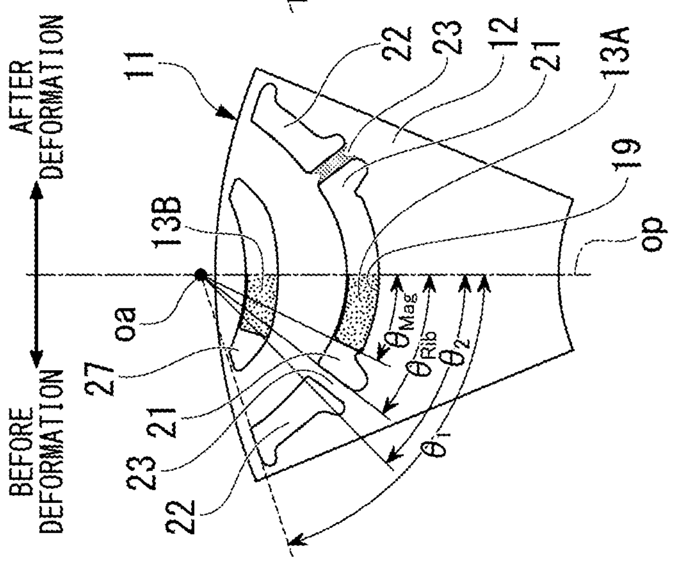
FIG. 4A is a schematic cross-sectional view of the rotor showing a deformation behavior of the rotor when a position of the rib is changed.

FIG. 4A, FIG. 4B and FIG. 4C are schematic cross-sectional views of the rotor 11 that show differences in deformation behaviors of the rotor 11 divided into FIG. 4A, FIG. 4B, FIG. 4C when a position (the opening angle θRib) of the rib 23 is changed.

In FIG. 4A, a position of the rib 23 is set such that the opening angle θRib of the rib 23 is smaller than the opening angle θ2 at the intermediate position of the void region.

In FIG. 4B, a position of the rib 23 is set such that the opening angle θRib of the rib 23 is the same as the opening angle θ2 at the intermediate position of the void region.

In FIG. 4C, a position of the rib 23 is set such that the opening angle θRib of the rib 23 is greater than the opening angle θ2 at the intermediate position of the void region.

In addition, a left half of each of FIG. 4A, FIG. 4B and FIG. 4C shows a state before the rotor 11 is deformed, and a right half of each drawing shows a deformation behavior of the rotor 11 when a tensile load is applied to the outer circumferential surface of the rotor 11 along the magnetic pole centerline op. Further, in a region of the right half of each of FIG. 4A, FIG. 4B and FIG. 4C, dots are attached to areas where stress is higher than a prescribed value.

As shown in FIG. 4A and FIG. 4B, when the opening angle θRib of the rib 23 is equal to or smaller than the opening angle θ2 at the intermediate position of the void region, the left and right ribs 23 receive the tensile load substantially along the magnetic pole centerline op as tension along the extension direction, and can efficiently suppress deformation of the rotor 11.

Meanwhile, as shown in FIG. 4C, when the opening angle θRib of the rib 23 is greater than the opening angle θ2 at the intermediate position of the void region, if a tensile load is applied to the rotor 11 substantially along the magnetic pole centerline op, bending stress occurs in each of the ribs 23, making it difficult to efficiently suppress deformation of the rotor 11.

Accordingly, the opening angle θRib of the rib 23 is set to be equal to or smaller than the opening angle θ2 at the intermediate position of the void region to satisfy the above-mentioned Equations (1) and (2), thereby efficiently suppressing deformation of the rotor 11.

In addition, the rotating electric machine 1 of the embodiment is disposed such that the magnet hole 19 crosses the magnetic pole centerline op, and the ribs 23 that connect the outer region and the inner region of the first void portion 21 and the second void portion 22 in the radial direction are disposed on one end side and the other end side of the magnet hole 19 in the extension direction. For this reason, as shown in FIG. 3, in the vicinity portion of the magnetic pole centerline op in which a magnet magnetic flux of the permanent magnet 13A and a rotating magnetic flux of the stator 10 are easily concentrated, the magnetic flux leakage due to wraparound of the magnet magnetic flux and the rotating magnetic flux is less likely to occur.

Figure 5:
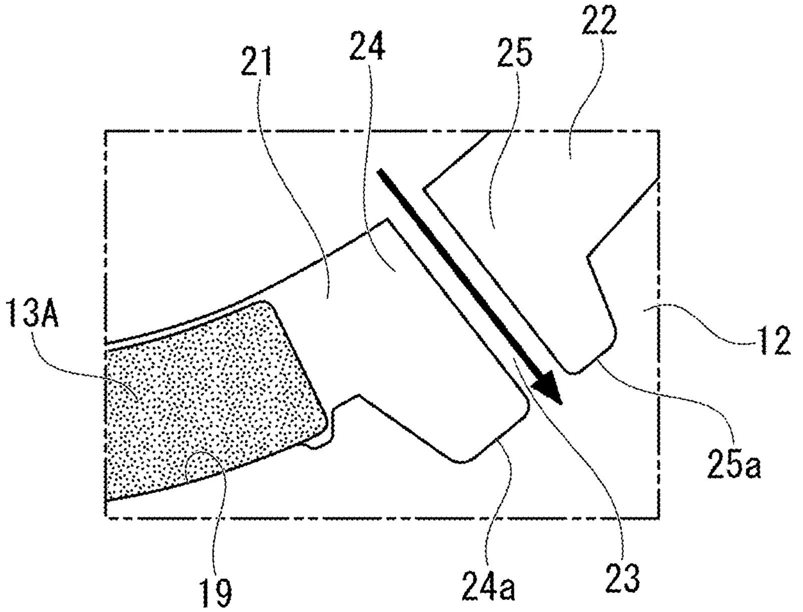
FIG. 5 is an enlarged view of a portion V of FIG. 1.

FIG. 5 is an enlarged view of a portion V of FIG. 1.

As shown in FIG. 5, the first void portion 21 of the magnet hole 19 on each of left and right sides includes a first flange portion 24 on the end portion on a side facing the rib 23, which is thicker than the permanent magnet 13A. In the case of the embodiment, the first flange portion 24 has an extension region 24*a* that extends inward in the radial direction approximately along a normal line nr with respect to a general portion of the first void portion 21 (a portion other than the first flange portion 24). The first flange portion 24 is thicker than the permanent magnet 13A by the length of the extension region 24*a*.

In addition, the second void portion 22 on each of left and right sides includes a second flange portion 25 in an end portion on a side facing the rib 23, which is thicker than the permanent magnet 13A. In the case of the embodiment, the second flange portion 25 has an extension region 25*a* extending inward in the radial direction approximately along the normal line nr with respect to a general portion of the second void portion 22 (a portion other than the second flange portion 25). The second flange portion 25 is thicker than the permanent magnet 13A by the length of the extension region 25*a*.

Accordingly, a length of the rib 23 formed between the first void portion 21 and the second void portion 22 is greater than the thickness of the permanent magnet 13A by an extent of each of the extension regions 24*a* and 25*a* of the flange portions 24 and 25. Since the rib 23 is constituted by a part of the rotor core 12 formed of a magnetic body, some of the magnet magnetic flux or the rotating magnetic flux flowing through the rotor core 12 may leak in the extension direction of the rib 23. However, since the rib 23 is set to a sufficient length in this way, a magnetic path resistance when the magnetic flux flows is increased. For this reason, the leakage of the magnetic flux passing through the rib 23 can be suppressed as much as possible.

Figure 6:
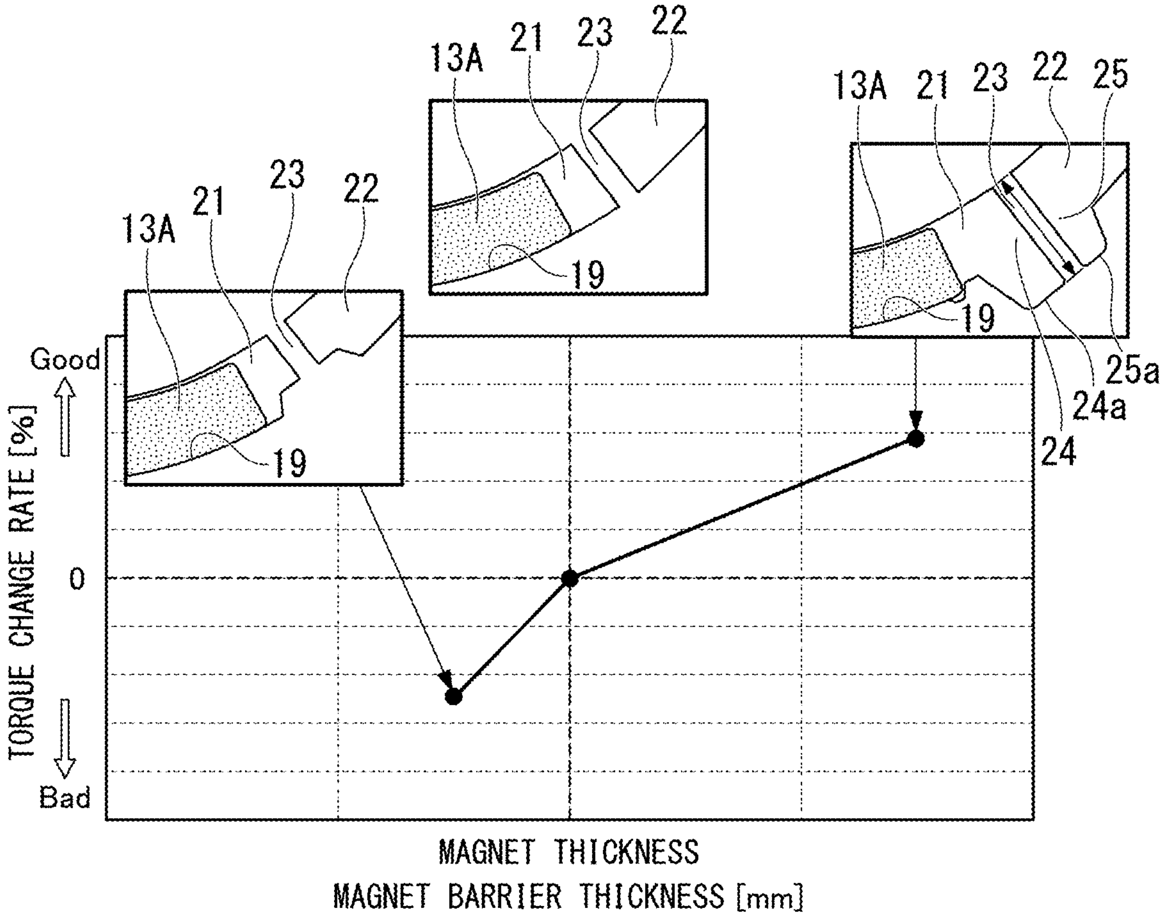
FIG. 6 is a graph showing a torque change rate of the rotating electric machine when thicknesses of end portions of a first void portion and a second void portion are changed.

FIG. 6 is a graph showing a torque change rate of the rotating electric machine 1 when thicknesses of end portions (end portions on a side facing the rib 23) of the first void portion 21 and the second void portion 22 are changed.

As shown in this drawing, if the torque change rate becomes 0 in the case in which the thickness of the end portion of the first void portion 21 and the second void portion 22 is the same as the thickness of the permanent magnet 13A, when the thickness of the end portion of the first void portion 21 and the second void portion 22 is smaller than the thickness of the permanent magnet 13A, the torque change rate increases in the negative direction approximately in proportion to the decrease in thickness. In addition, when the thickness of the end portion of the first void portion 21 and the second void portion 22 is greater than the thickness of the permanent magnet 13A, the torque change rate increases in the positive direction approximately in proportion to the increase in thickness.

Accordingly, as is clear from this drawing, by providing the first flange portion 24 and the second flange portion 25 having a sufficient thickness on the end portions of the first void portion 21 and the second void portion 22, it is possible to increase a rotating torque of the rotating electric machine 1.

Figure 7:
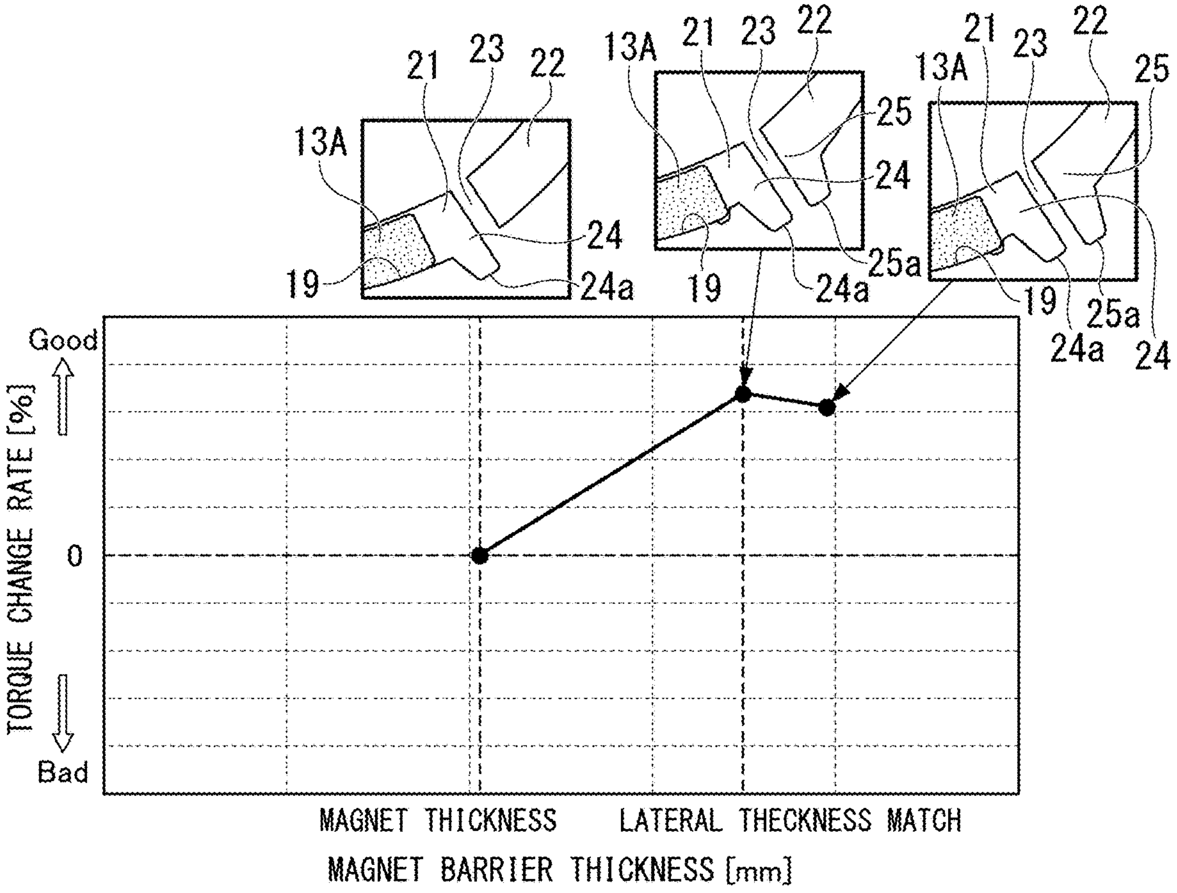
FIG. 7 is a graph showing a torque change rate of the rotating electric machine when a shape of the end portion of the second void portion is changed.

FIG. 7 is a graph showing a torque change rate of the rotating electric machine 1 when a shape of the end portion (the end portion on the side facing the rib 23) of the second void portion 22 is changed.

As shown in this drawing, with reference to the case in which the first flange portion 24 is provided on the end portion of the first void portion 21 and no flange portion is provided on the end portion of the second void portion 22, when the extension length of the second flange portion 25 provided on the end portion of the second void portion 22 is gradually increased from this state, the positive torque change rate of the rotating electric machine 1 is maximized when the extension lengths of the first flange portion 24 and the second flange portion 25 are the same.

Figure 8:
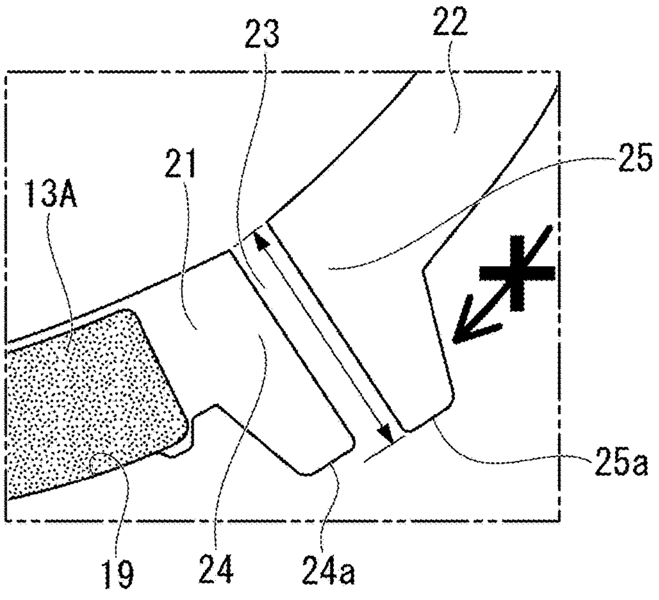
FIG. 8 is a schematic cross-sectional view of the rotor when an extension length of the second flange portion is greater than that of the first flange portion.

FIG. 8 is a schematic cross-sectional view of the rotor 11 when the extension length of the second flange portion 25 is greater than the extension length of the first flange portion 24.

As shown in FIG. 8, when the length of the extension region 25*a* of the second flange portion 25 is greater than the length of the extension region 24*a* of the first flange portion 24, the rotating magnetic flux flowing from the outer circumferential edge portion of the rotor core 12 along the extension direction of the second void portion 22 is blocked by the extension region 25*a* of the second flange portion 25. For this reason, the rotating magnetic flux cannot be sufficiently utilized to increase the rotating torque of the rotating electric machine 1. Accordingly, by making the extension lengths of the extension regions 24*a* and 25*a* of the first flange portion 24 and the second flange portion 25 the same, the rotating torque of the rotating electric machine 1 can be further increased.

Figure 9:
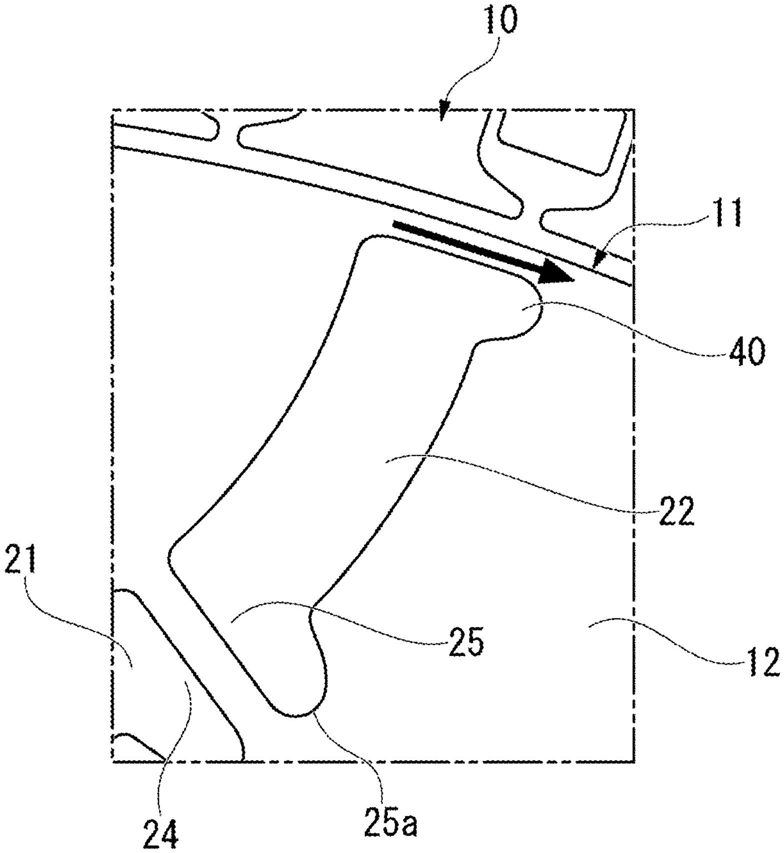
FIG. 9 is an enlarged view of a portion IX of FIG. 1.

FIG. 9 is an enlarged view of a portion IX of FIG. 1.

As shown in FIG. 9, the magnet magnetic flux or the rotating magnetic flux may wrap around the region between the outer end portion of the second void portion 22 in the extension direction (the end portion on the side separated from the magnetic pole centerline op) and the outer circumferential surface of the rotor core 12.

Figure 10:
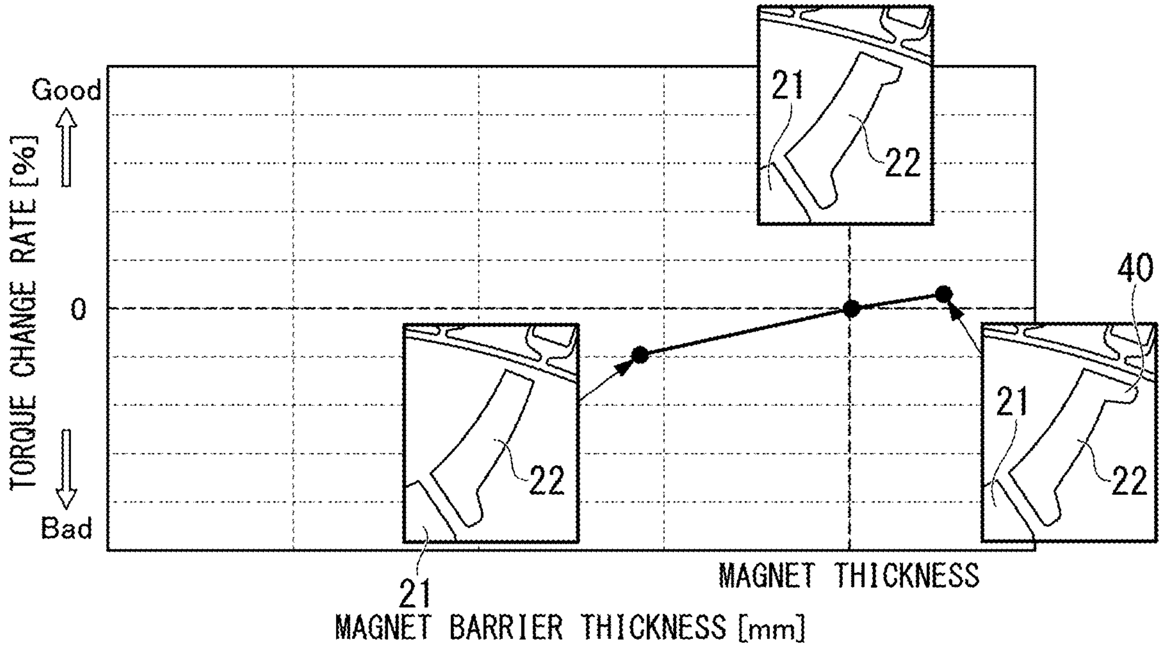
FIG. 10 is a graph showing a torque change rate of the rotating electric machine when a shape of the outer end portion of the second void portion is changed.

FIG. 10 is a graph showing a torque change rate of the rotating electric machine 1 when a shape of the outer end portion of the second void portion 22 (the end portion on the side separated from the magnetic pole centerline op) is changed.

As shown in FIG. 10, when the thickness of the outer end portion of the second void portion 22 is increased, the torque change rate of the rotating electric machine 1 increases positively according thereto. That is, it is desirable to provide a third flange portion 40 thicker than the permanent magnet 13A in the outer end portion on the side separated from the magnetic pole centerline op of the second void portion 22. Accordingly, the torque change rate of the rotating electric machine 1 can be increased positively. This is because the length of the region between the outer end portion of the second void portion 22 and the outer circumferential surface of the rotor core 12 is increased by increasing the thickness of the outer end portion of the second void portion 22 (by providing the third flange portion 40 on the outer end portion), and as a result, the magnetic path resistance of the magnetic flux flowing through the region is increased. Accordingly, the rotating torque of the rotating electric machine 1 can be increased by providing the third flange portion 40 thicker than the permanent magnet 13A on the outer end portion of the second void portion 22.

In addition, the second magnetic pole configuration part 18S shown in FIG. 1 includes a magnet hole 26, a permanent magnet 13B, and a void portion 27.

The magnet hole 26 of the second magnetic pole configuration part 18S is a hole passing through the rotor core 12 in the axial direction, and the magnetic pole centerline op extends to cross the circumferential direction. A shape of the magnet hole 26 in the axial direction is an arc shape in which an arbitrary point outside the outer circumferential surface of the rotor 11 in the radial direction on the magnetic pole centerline op is set as an arc center. The magnet hole 26 has both end portions in the extension direction curved toward the outside in the radial direction, similar to the magnet hole 19 in the first magnetic pole configuration part 18F.

The permanent magnet 13B is formed in an arc shape when seen in the axial direction, and inserted into the magnet hole 26 so as to cross the magnetic pole centerline op. The permanent magnet 13B is disposed at a center region of the magnet hole 26 in the extension direction. The permanent magnet 13B is fixed to the inner circumferential surface of the magnet hole 26 by press-fitting or adhesion.

The length of the permanent magnet 13B in the extension direction is set to be sufficiently smaller than the length of the magnet hole 26 in the extension direction. Spaces between both end portions of the permanent magnet 13B accommodated in the magnet hole 26 in the extension direction and between both end portions of the magnet hole 26 in the extension direction are the void portions 27. The void portions 27 disposed on both sides of the permanent magnet 13B function as a flux barrier configured to restrict a flow of the magnet magnetic flux or the rotating magnetic flux.

As described above, in the rotating electric machine 1 of the embodiment, the magnet hole 19 of the first magnetic pole configuration part 18F is disposed so as to cross the magnetic pole centerline op, and the ribs 23 that connect the outer region and the inner region of the first void portion 21 and the second void portion 22 in the radial direction are disposed on one end side and the other end side of the magnet hole 19 in the extension direction. For this reason, in the vicinity portion of the magnetic pole centerline op to which the magnet magnetic flux and the rotating magnetic flux are likely to be concentrated, the magnetic flux leakage due to wraparound of the magnet magnetic flux and the rotating magnetic flux is less likely to occur. Since the rib 23 is formed such that the opening angle θRib satisfies the above-mentioned Equation (1) and Equation (2), when a tensile load acts in a direction substantially along the magnetic pole centerline op, bending stress is less likely to occur in the rib 23. For this reason, the mechanical strength of the rotor 11 can be maintained high.

Accordingly, when the rotating electric machine 1 of the embodiment is employed, it is possible to suppress wraparound of the magnet magnetic flux or the rotating magnetic flux in the vicinity portion of the magnetic pole centerline op, and the mechanical strength of the rotor 11 can be increased by the left and right ribs 23. Accordingly, when the rotating electric machine 1 of the embodiment is employed, it is possible to achieve reduction in size and weight of the permanent magnet 13A to be mounted, and contribute to energy efficiency.

In addition, in the rotating electric machine 1 of the embodiment, the first flange portion 24 thicker than the permanent magnet 13A is provided on the end portion of the first void portion 21 facing the rib 23, and the second flange portion 25 thicker than the permanent magnet 13A is provided on the end portion of the second void portion 22 facing the rib 23. For this reason, the length in the extension direction of the rib 23 formed between the first void portion 21 and the second void portion 22 is sufficiently long, and it is possible to increase the magnetic path resistance of the magnetic flux that is going to flow through the rib 23. Accordingly, it is possible to further suppress wraparound of the magnet magnetic flux or the rotating magnetic flux passing through the rib 23.

Accordingly, when the rotating electric machine 1 of the embodiment is employed, the magnetic force of the permanent magnet 13A can be more effectively used, and further reduction in size and weight of the permanent magnet 13A can be achieved.

In addition, in the rotating electric machine 1 of the embodiment, the extension lengths of the first flange portion 24 and the second flange portion 25 inward in the radial direction are set to substantially the same length. For this reason, one flange portion with a long extension length no longer impedes the flow of the rotating magnetic flux. Accordingly, when the rotating electric machine 1 of the configuration is employed, the magnetic force of the permanent magnet 13A can be more effectively used.

Further, in the rotating electric machine 1 of the embodiment, the third flange portion 40 thicker than the permanent magnet 13A is provided on the outer end portion of the second void portion 22 on the side separated from the magnetic pole centerline op. For this reason, the length of the magnetic flux passage between the outer end portion of the second void portion 22 and the outer circumferential surface of the rotor core 12 (the rotor 11) is increased, and the magnetic path resistance of the magnetic flux flowing through the magnetic flux passage is increased. As a result, wraparound of the magnetic flux in the vicinity of the outer end portion of the second void portion 22 is suppressed. Accordingly, when the configuration is employed, the magnetic force of the permanent magnet 13A can be more effectively used, and further reduction in size and weight of the permanent magnet 13A can be achieved.

Second Embodiment

Figure 11:
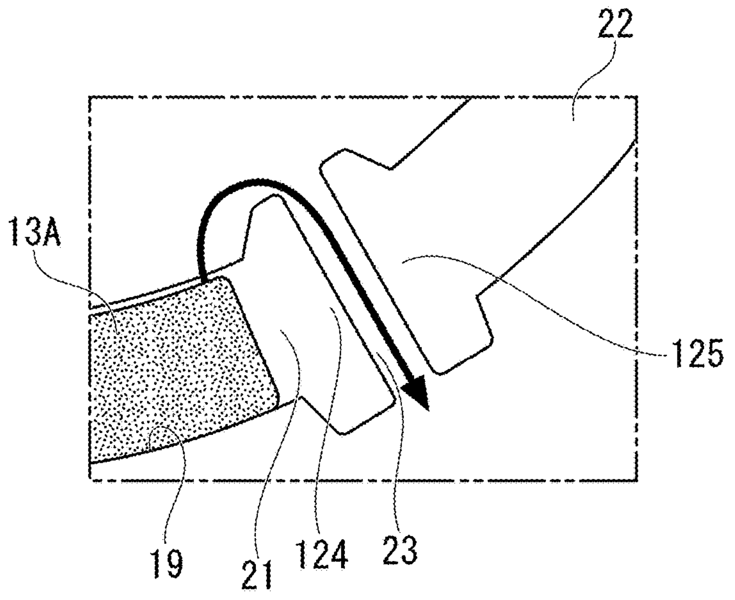
FIG. 11 is an enlarged cross-sectional view showing a part of a rotor of a second embodiment.

FIG. 11 is an enlarged cross-sectional view showing a part of the rotor 11 of the embodiment like FIG. 5.

A basic configuration of the rotating electric machine of the embodiment is substantially the same as that of the first embodiment. However, in the first embodiment, while the first flange portion 24 of the first void portion 21 and the second flange portion 25 of the second void portion 22 extend inward only in the radial direction, a first flange portion 124 and a second flange portion 125 of the embodiment extend not only inward in the radial direction but also outward in the radial direction. In the case of the embodiment, the extension length inward in the radial direction and the extension length outward in the radial direction of the first flange portion 124 and the second flange portion 125 have substantially the same length.

Figure 12:
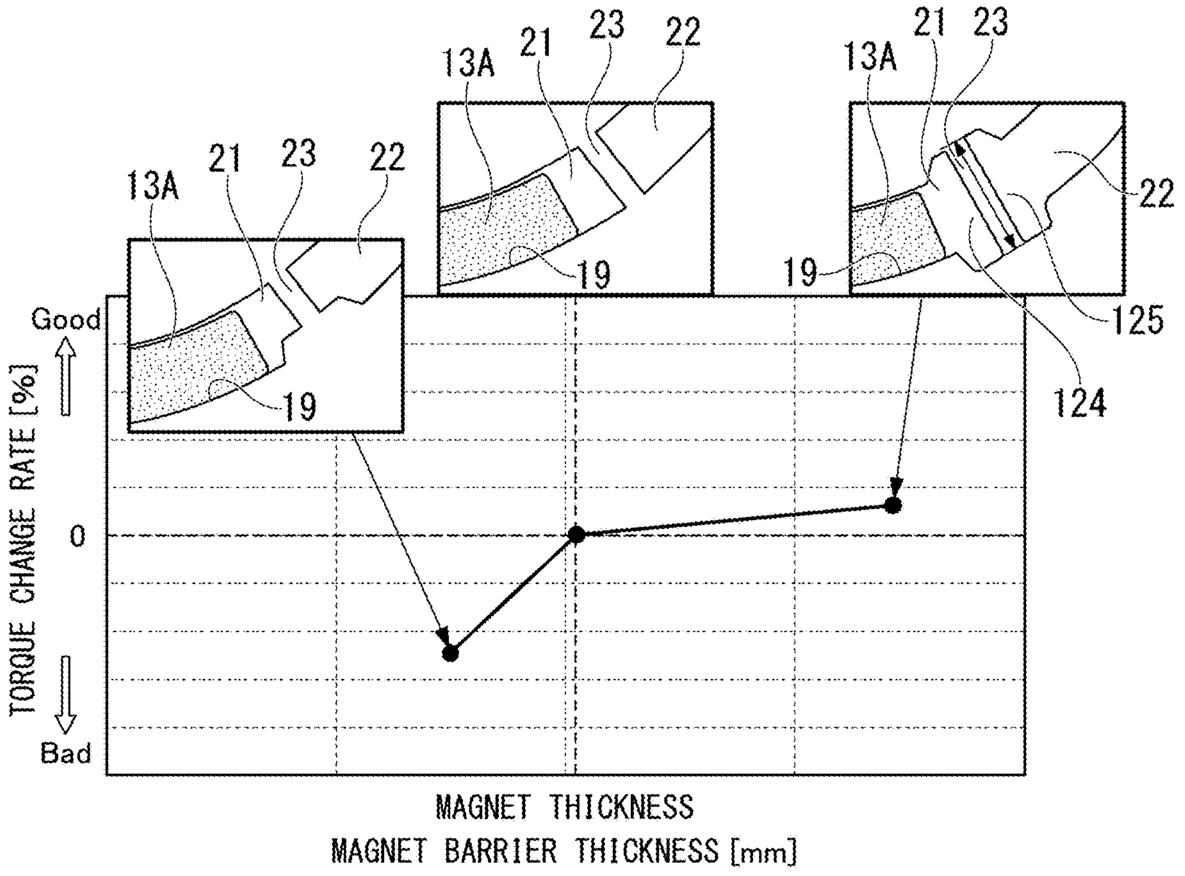
FIG. 12 is a graph of a torque change rate of the rotating electric machine when shapes of end portions of a first void portion and a second void portion are changed.

FIG. 12 is a graph showing a torque change rate of the rotating electric machine when shapes of the end portions of the first void portion 21 and the second void portion 22 (the end portion on the side facing the rib 23) are changed.

As shown in this drawing, when the thickness of the end portions of the first void portion 21 and the second void portion 22 is smaller than the thickness of the permanent magnet 13A, the torque change rate increases in the negative direction approximately in proportion to the decrease in thickness, and when the thickness of the end portions of the first void portion 21 and the second void portion 22 is greater than the thickness of the permanent magnet 13A, the torque change rate increases in the positive direction approximately in proportion to the increase in thickness. Then, when the first flange portion 124 and the second flange portion 125 that form the end portions of the first void portion 21 and the second void portion 22 extend to both of inner and outer sides in the radial direction, respectively, the extension length of the rib 23 can be increased while suppressing an increase in the extension length per side.

Since the rotating electric machine of this embodiment has the same basic configuration as that of the first embodiment, it is possible to obtain the same basic effects as the above-mentioned first embodiment.

In addition, in the rotating electric machine of the embodiment, since the first flange portion 124 and the second flange portion 125 extend to both of the inner and outer sides in the radial direction, compared to the case in which the first flange portion 124 and the second flange portion 125 extend only to one of the inner and outer sides of the radial direction, the extension length per side required to obtain the same magnetic flux leakage prevention effect can be shortened.

Third Embodiment

Figure 13:
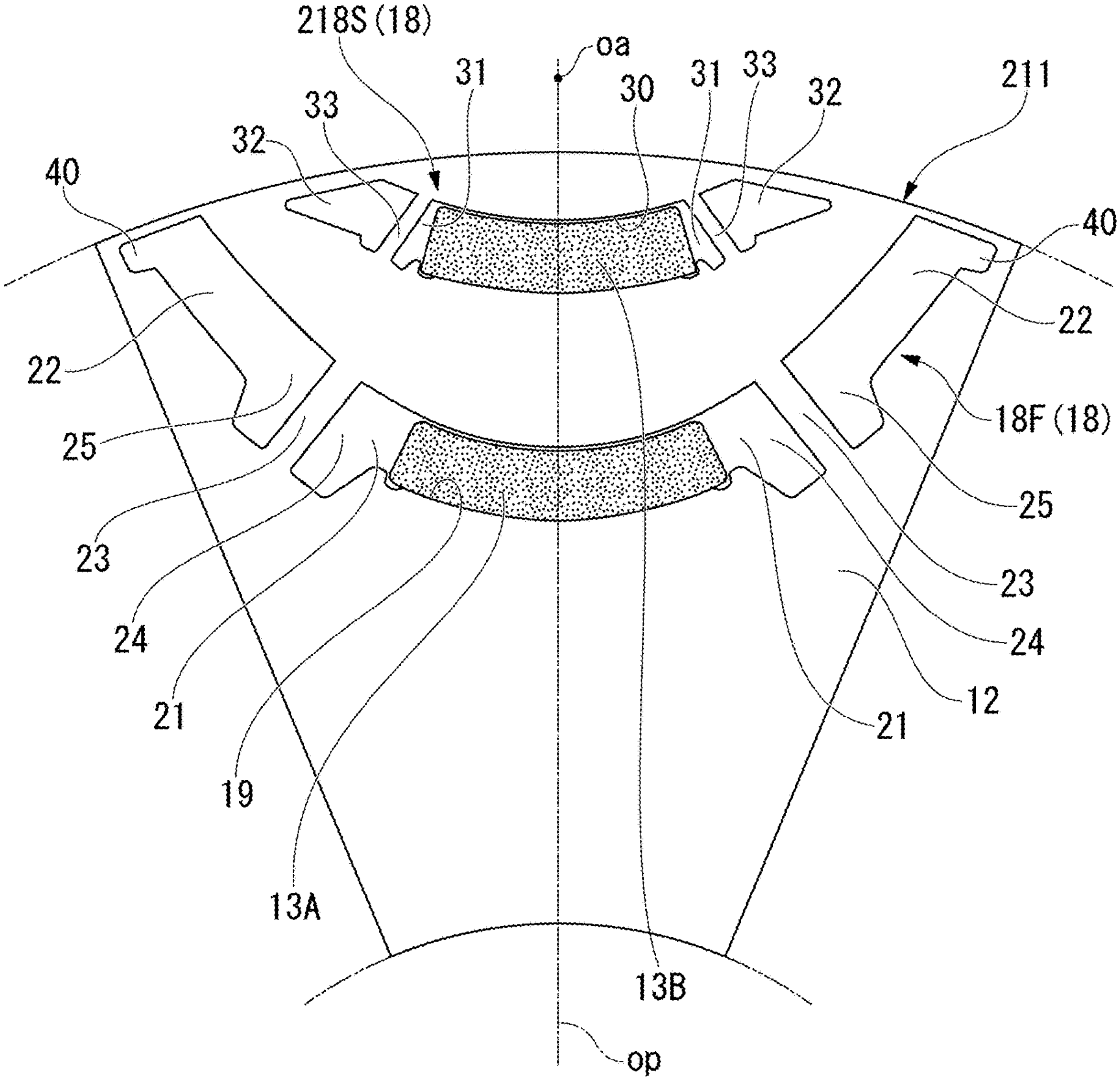
FIG. 13 is a cross-sectional view of a rotor of a third embodiment perpendicular to the axial direction.

FIG. 13 is a view showing a cross section of a rotor 211 of the embodiment perpendicular to the axial direction.

In the rotating electric machine of the embodiment, while the configuration of the first magnetic pole configuration part 18F of each of the magnetic poles 18 is the same as that of the first embodiment, a configuration of a second magnetic pole configuration part 218S of each of the magnetic poles 18 is different from that of the first embodiment. The second magnetic pole configuration part 218S of the embodiment has substantially the same configuration as the first magnetic pole configuration part 18F.

The second magnetic pole configuration part 218S is disposed separately outside the first magnetic pole configuration part 18F in the radial direction, and includes a magnet hole 30, the permanent magnet 13B, a first void portion 31, a second void portion 32, and a rib 33.

The magnet hole 30 extends to cross the magnetic pole centerline op (d axis) in the circumferential direction. The magnet hole 30 is a hole passing through the rotor core 12 in the axial direction. A shape of the magnet hole 30 when seen in the axial direction is an arc shape in which an arbitrary point outside the outer circumferential surface of the rotor 211 in the radial direction on the magnetic pole centerline op is set as an arc center. The magnet hole 30 has both end portions in the extension direction curved outward in the radial direction.

The permanent magnet 13B is formed in an arc shape when seen in the axial direction, and inserted into the magnet hole 30 so as to cross the magnetic pole centerline op. The permanent magnet 13B is disposed in a center region of the magnet hole 30 in the extension direction. The permanent magnet 13B is fixed to the inner circumferential surface of the magnet hole 30 by press-fitting or adhesion.

The first void portion 31 is a void portion formed between both end portions of the magnet hole 30 in the extension direction and each end surface of the permanent magnet 13B, which is provided to face end surfaces of both sides of the permanent magnet 13B in the extension direction. The second void portion 32 is a void portion extending separately from the magnet hole 30 on extension of the end portions on both sides of the magnet hole 30 in the extension direction. The second void portion 32 is formed in an arc shape having the same radius about the same arc center as the first void portion 31. The first void portion 31 and the second void portion 32 function as a flux barrier configured to restrict a flow of the magnetic flux outside the permanent magnet 13B in the extension direction.

The rib 33 is disposed between the first void portion 31 and the second void portion 32 on left and right sides of the permanent magnet 13B. Each of the left and right ribs 33 extends substantially along the normal line about the arc center of the magnet hole 30 and the second void portion 32. Each of the ribs 33 connects the outer region and the inner region of the first void portion 31 and the second void portion 32 in the radial direction.

In the rib 23, the opening angle θRib with respect to the magnetic pole centerline op is set so as to satisfy Equation (1) and Equation (2) disclosed in the description of the first embodiment.

However, in applying Equation (1) and Equation (2) in the second magnetic pole configuration part 218S, the definitions of the opening angles θMag, θRib, θ1 and θ2 shall be read as follows.

[Opening Angle θMag]

An opening angle between the magnetic pole centerline op and the normal line passing through the outer end portion of the permanent magnet 13B on the side separated from the magnetic pole centerline op.

[Opening Angle θRib]

An opening angle between the magnetic pole centerline op and the normal line passing through the outer end portion of the first void portion 31 on the side separated from the magnetic pole centerline op.

[Opening Angle θ1]

An opening angle between the magnetic pole centerline op and the normal line passing through the outer end portion of the second void portion 32 on the side separated from the magnetic pole centerline op.

[Opening Angle θ2]

An opening angle between the magnetic pole centerline op and the normal line passing through the intermediate position between the outer end portion of the permanent magnet 13B on the side separated from the magnetic pole centerline op and the outer end portion of the second void portion 32 on the side separated from the magnetic pole centerline op.

As described above, since the rotating electric machine of the embodiment includes the first magnetic pole configuration part 18F having the same configuration as that of the first embodiment, the same basic effects as in the above-mentioned first embodiment can be obtained. In addition thereto, in the rotating electric machine of the embodiment, since the second magnetic pole configuration part 218S having substantially the same configuration as the first magnetic pole configuration part 18F is disposed outside the first magnetic pole configuration part 18F in the radial direction, a larger rotating torque can be obtained by the plurality of magnetic poles (magnetic pole configuration part) disposed in the radial direction.

Fourth Embodiment

Figure 14:
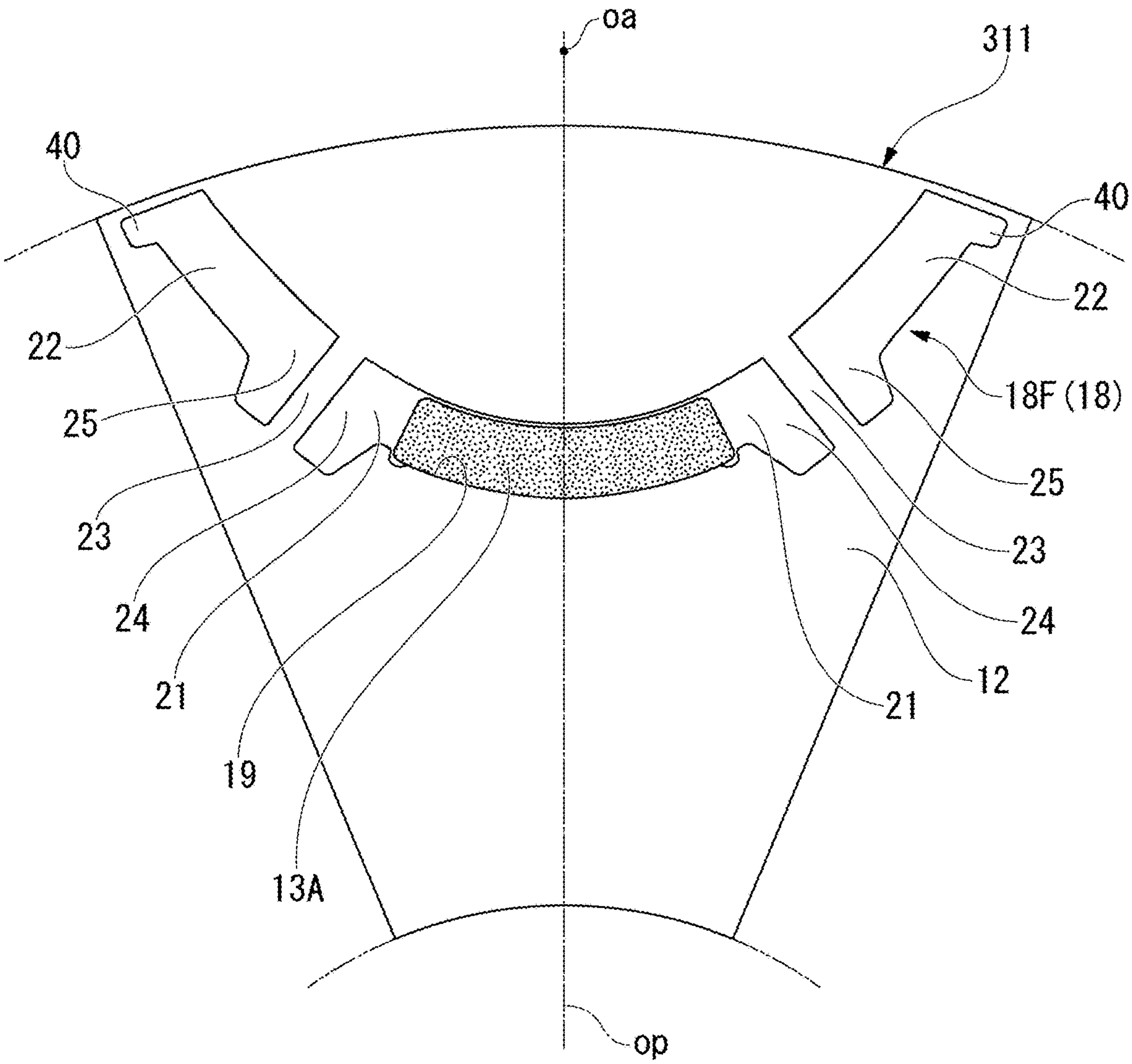
FIG. 14 is a cross-sectional view of a rotor of a fourth embodiment perpendicular to the axial direction.

FIG. 14 is a view showing a cross section of a rotor 311 of the embodiment perpendicular to the axial direction.

The rotating electric machine of the embodiment includes the first magnetic pole configuration part 18F similar to the first embodiment. However, the second magnetic pole configuration part 18S according to the first embodiment or the second magnetic pole configuration part 218S according to the third embodiment is not provided.

Since the rotating electric machine of the embodiment includes the first magnetic pole configuration part 18F while not including the second magnetic pole configuration part 18S or 218S, the same basic effects as in the above-mentioned first embodiment can be obtained.

Fifth Embodiment

Figure 15:
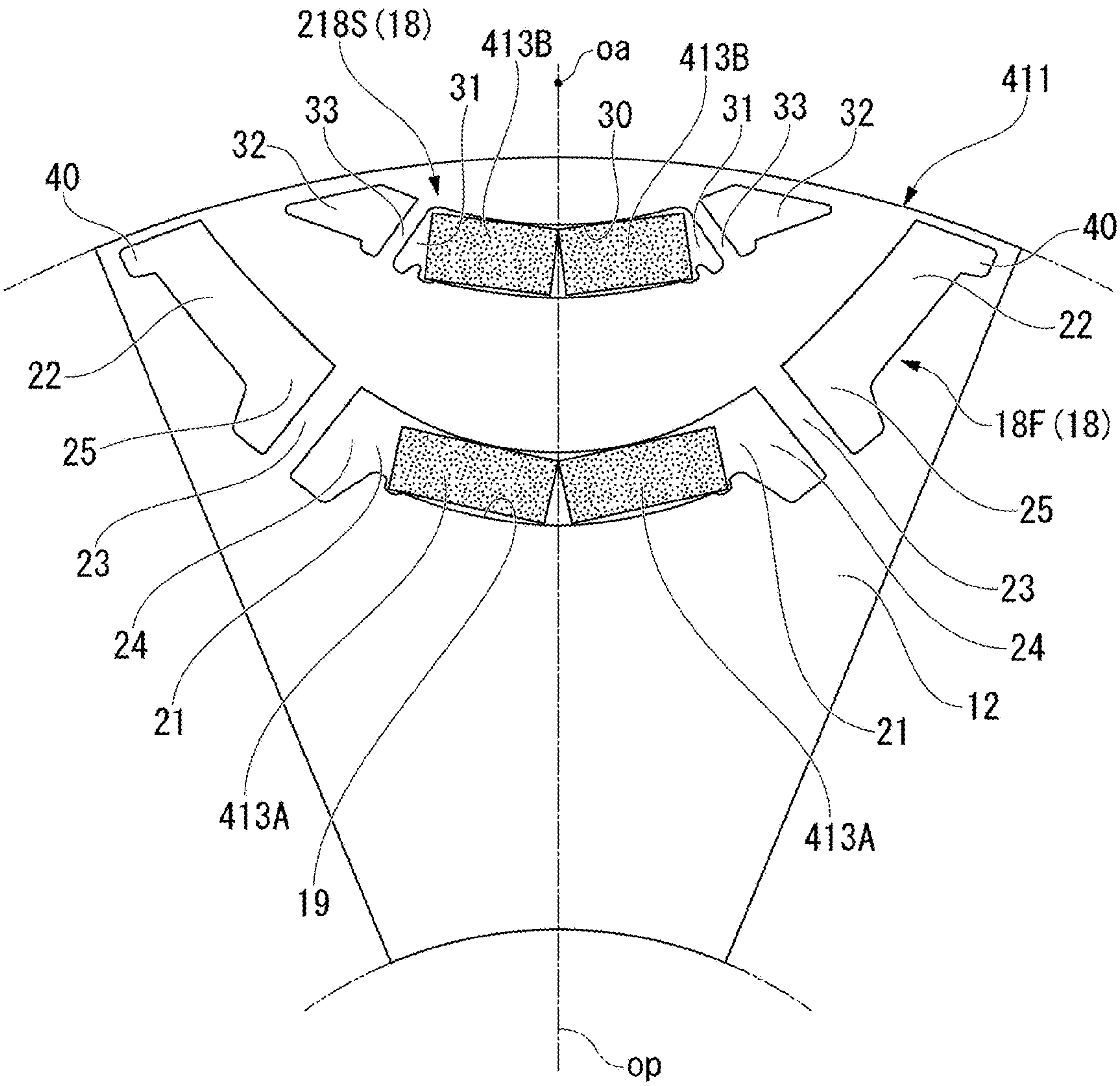
FIG. 15 is a cross-sectional view of a rotor of a fifth embodiment perpendicular to the axial direction.

FIG. 15 is a view showing a cross section of a rotor 411 of the embodiment perpendicular to the axial direction.

A basic configuration of the rotating electric machine of the embodiment is the same as that of the third embodiment shown in FIG. 13. That is, the first magnetic pole configuration part 18F and the second magnetic pole configuration part 218S having the same configuration are arranged in two layers in the radial direction of the rotor 411.

However, in the third embodiment shown in FIG. 13, the permanent magnets 13A and 13B having a substantially circular arc shape when seen in the axial direction are accommodated in the magnet hole 19 of the first magnetic pole configuration part 18F and the magnet hole 30 of the second magnetic pole configuration part 218S, respectively. On the other hand, in the rotating electric machine of the embodiment, two permanent magnets 413A and 413B each having a substantially rectangular shape when seen in the axial direction are accommodated in each of the magnet hole 19 of the first magnetic pole configuration part 18F and the magnet hole 30 of the second magnetic pole configuration part 218S.

While each pair of the permanent magnets 413A and 413B are accommodated in each of the magnet holes 19 and 30, each pair of the permanent magnets 413A and 413B are placed close to each other with no gap.

Since the rotating electric machine of the embodiment has substantially the same basic configuration as that of the third embodiment, the same basic effects as in the above-mentioned third embodiment can be obtained.

In addition thereto, in the rotating electric machine of the embodiment, the permanent magnets 413A and 413B accommodated in each of the magnet holes 19 and 30 are constituted by a pair of split pieces having a substantially rectangular shape when seen in the axial direction, the shape of each of the permanent magnets 413A and 413B can be simplified, and manufacturing of the permanent magnets 413A and 413B can be facilitated. In particular, like the embodiment, when all the permanent magnets 413A and 413B are set to the same shape and size, productivity will be good and product cost can be reduced.

Sixth Embodiment

Figure 16:
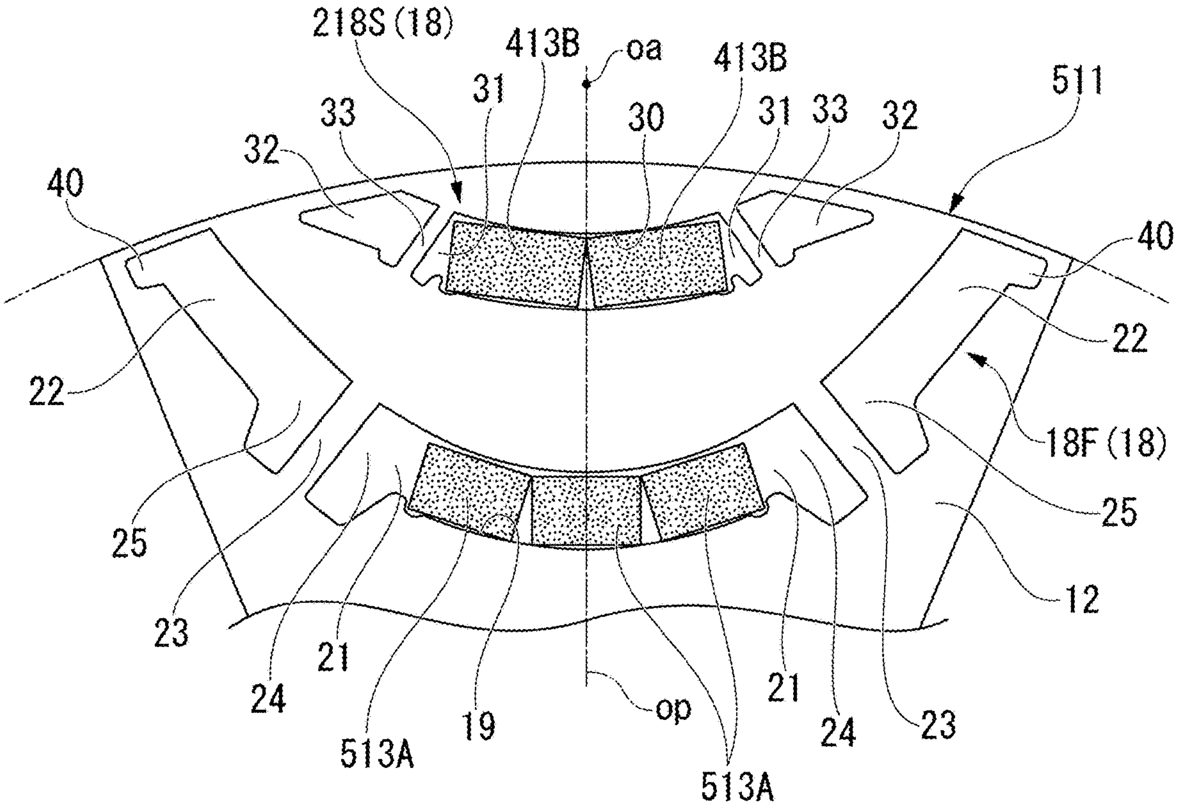
FIG. 16 is a cross-sectional view of a rotor of a sixth embodiment perpendicular to the axial direction.

FIG. 16 is a view showing a cross section of a rotor 511 of the embodiment perpendicular to the axial direction.

While the rotating electric machine of the embodiment has substantially the same configuration as that of the fifth embodiment, it is distinguished from the fifth embodiment in that a permanent magnet 513A accommodated in the magnet hole 19 of the first magnetic pole configuration part 18F is constituted by three split pieces having a substantially rectangular shape when seen in the axial direction. The permanent magnet 513A uses three pieces with the same shape and size. The three split pieces of the permanent magnet 513A are disposed at positions such that one disposed at a center crosses the magnetic pole centerline op.

The rotating electric machine of the embodiment can obtain the same effects as those of the fifth embodiment, the center permanent magnet 513A (center split piece) accommodated in the magnet hole 19 is disposed across the magnetic pole centerline op, and the three permanent magnets 513A are accommodated in the magnet hole 19 so as to form a smooth arc. For this reason, it becomes possible to use the magnet magnetic flux and the rotating magnetic flux more effectively without loss.

Seventh Embodiment

Figure 17:
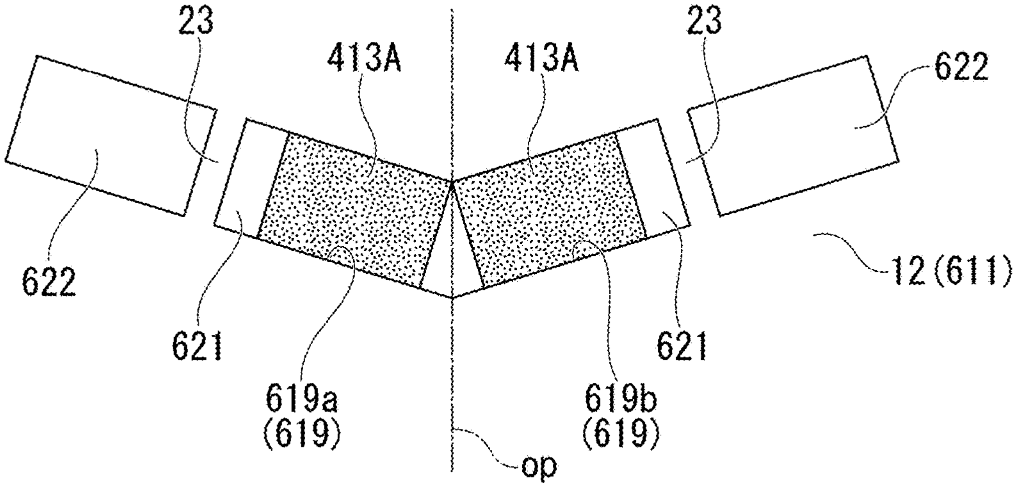
FIG. 17 is an enlarged cross-sectional view of a portion of a rotor of a seventh embodiment.

FIG. 17 is an enlarged cross-sectional view of a part of a rotor 611 of the embodiment.

In the rotating electric machine of the embodiment, a shape of a magnet hole 619 including a first void portion 621 and a shape of a second void portion 622 disposed outside the first void portion 621 in the extension direction are different from those of the above-mentioned other embodiments.

The magnet hole 619 extends so as to cross the magnetic pole centerline op in the circumferential direction, and a shape when seen in the axial direction has substantially a V shape that opens outward in the radial direction. In the magnet hole 619, hole configuration parts 619*a* and 619*b* having a constant width are inclined outward in the radial direction and extend leftward and rightward with the magnetic pole centerline op as the center. A permanent magnet 413A having a substantially rectangular shape when seen in the axial direction is accommodated in each of the hole configuration parts 619*a* and 619*b*. A void is secured between the end portion of each of the hole configuration parts 619*a* and 619*b* in the extension direction and the permanent magnet 413A, and the void is defined as the first void portion 621.

Further, to be more precise, the magnet hole 619 of the embodiment has approximately a V shape when seen in the axial direction, but it is approximately arc-shaped so that both end portions in the extension direction are close to the outer circumferential edge portion of the rotor 611.

The second void portion 622 extends linearly on the extension of the end portion of each of the hole configuration parts 619*a* and 619*b* in the extension direction at the same angle as the inclination angle of each of the hole configuration parts 619*a* and 619*b*. The second void portion 622 is spaced apart from the first void portion 621 adjacent thereto by a predetermined width. The rib 23 is provided between the first void portion 621 and the second void portion 622.

While the rotating electric machine of the embodiment is distinguished from the other embodiment in that a shape of the magnet hole 619 including the first void portion 621 is different from a shape of the second void portion 622, since the basic structure itself remains unchanged, it is possible to obtain the same basic effects as those of the other embodiments mentioned above.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A rotating electric machine comprising:

an annular stator; and a rotor rotatably disposed inside the stator in a radial direction and on which a plurality of magnetic poles are spaced apart from each other in a circumferential direction, wherein the magnetic poles of the rotor each include:

a magnet hole extending so as to cross a magnetic pole centerline, which extends in the radial direction of the rotor, in the circumferential direction and formed in an arc shape in which an arbitrary point radially outward from an outer circumferential surface of the rotor on the magnetic pole centerline is set as an arc center when seen in the axial direction such that both end portions in an extension direction approach an outer circumferential edge portion of the rotor;

a permanent magnet that is inserted into the magnet hole having an arc shape so as to be provided along the magnet hole and that is formed in an arc shape having a same radius with the magnet hole about the arc center same as the magnet hole when seen in the axial direction;

a first void portion that is formed between both end portions of the magnet hole in the extension direction and the permanent magnet and that has an arc shape having the same radius about the arc center;

a second void portion that is extending on an extension line of both end portions of the magnet hole in the extension direction and separated from the magnet hole and that has an arc shape having the same radius about the arc center; and a rib disposed between the first void portion and the second void portion and connecting an outer region and an inner region of the first void portion and the second void portion in the radial direction, and provided that an opening angle between the magnetic pole centerline and a normal line passing through an outer end portion of the permanent magnet on a side separated from the magnetic pole centerline is θMag, provided that an opening angle between the magnetic pole centerline and a normal line passing through an outer end portion of the first void portion on a side separated from the magnetic pole centerline is θRib, provided that an opening angle between the magnetic pole centerline and a normal line passing through an outer end portion of the second void portion on a side separated from the magnetic pole centerline is θ1, and provided that an opening angle between the magnetic pole centerline and a normal line passing through an intermediate position between the outer end portion of the permanent magnet on the side separated from the magnetic pole centerline and the outer end portion of the second void portion on the side separated from the magnetic pole centerline is θ2, wherein the opening angle θRib is set to satisfy the following Equation (1) and Equation (2), $$\theta 2=(\theta 1+\theta Mag)/2 \tag{1}$$

$$\theta Rib<\theta 2. \tag{2}$$

2. The rotating electric machine according to claim 1, wherein the first void portion includes a first flange portion which is provided on an end portion facing the rib and which is thicker than the permanent magnet, and the second void portion includes a second flange portion which is provided on an end portion facing the rib and which is thicker than the permanent magnet.

3. The rotating electric machine according to claim 2, wherein the first flange portion and the second flange portion have substantially the same extension length inward in the radial direction of the rotor.

4. The rotating electric machine according to claim 2, wherein the first flange portion and the second flange portion extend inward in the radial direction and outward in the radial direction of the rotor, respectively.

5. The rotating electric machine according to claim 1, wherein the second void portion includes a third flange portion which is provided on an outer end portion separated from the magnetic pole centerline and which is thicker than the permanent magnet.

6. The rotating electric machine according to claim 1, wherein configuration parts of the magnetic pole including the magnet hole, the permanent magnet, the first void portion, the second void portion, and the rib are arranged in a plurality of layers in the radial direction.

* * * * *